United States Patent [19]

Borchmann et al.

[11] Patent Number: 5,614,888
[45] Date of Patent: Mar. 25, 1997

[54] CIRCUIT BREAKER WITH AN ALARM DEVICE AND A CIRCUIT FOR GENERATING AN ALARM IN A CIRCUIT BREAKER

[75] Inventors: Oliver Borchmann, Köln; Thomas Bungartz, Stadtkyll, both of Germany

[73] Assignee: Klöckner-Moeller GmbH, Bonn, Germany

[21] Appl. No.: 398,594

[22] Filed: Mar. 3, 1995

[30] Foreign Application Priority Data

Mar. 3, 1994 [DE] Germany .................. 44 06 902.2

[51] Int. Cl.$^6$ .................................. G08B 21/00
[52] U.S. Cl. .................. 340/638; 340/635; 340/641; 340/644; 335/17
[58] Field of Search ............... 340/638, 641, 340/644, 653, 635; 335/17

[56] References Cited

U.S. PATENT DOCUMENTS 4,358,810  11/1982  Wafer et al. .................. 340/638

FOREIGN PATENT DOCUMENTS 3114551  3/1982  Germany .

Primary Examiner—Thomas Mullen
Assistant Examiner—Julie B. Lieu
Attorney, Agent, or Firm—Nils H. Ljungman and Associates

[57] ABSTRACT

A circuit configuration for a signalling device in circuit breaker units, in particular in power circuit breakers, which have an electronic tripping device and which become effective in the event of a fault in an electrical system to be protected, whereby the electronic tripping device includes a microcontroller which performs a fault evaluation, and for each type of fault makes available an output pin, from which the corresponding fault signal is amplified and transmitted to an electrical relay. The fault signal (FM, FM1 ... FMn) is transmitted to the circuit configuration (SA, SA1 ... SAn), and by means of logic operation with the action of a static standard signal and of a clock pulse signal (Clock Pulse) acts on the electrical relay, which is realized in the form of a bistable relay (RB, RB1 ... RBn) the contact system of which corresponds to a make function or a break function, depending on the signal status of the standard signal.

19 Claims, 4 Drawing Sheets

5,614,888

CIRCUIT BREAKER WITH AN ALARM DEVICE AND A CIRCUIT FOR GENERATING AN ALARM IN A CIRCUIT BREAKER

BACKGROUND OF THE INVENTION

1. Field of the Invention

The present invention relates to a circuit configuration for an alarm device in circuit breaker units, in particular in power circuit breakers, which have an electronic tripping device and which become effective in the event of a fault in an electrical system to be protected, whereby the electronic tripping device includes a microcontroller which performs a fault evaluation, and for each type of fault makes available an output pin, from which the corresponding fault signal is amplified and transmitted to an electrical relay.

2. Background Information

A circuit breaker unit of the type described above has been described in the form of an NZM 10 Power Circuit Breaker manufactured by the firm of Kloeckner-Moeller, Bonn, Federal Republic of Germany.

The action of the electronic release, or trip device, of this power circuit breaker, which is realized by a corresponding circuit configuration, was described in an advertising publication, W 123-7276, published by Kloeckner-Moeller.

The above-cited publication describes the action of an NZM 10 Power Circuit Breaker which includes a modular system. One of the modules is an alarm, or event, signalling block, which signals the breaker functions "overload tripping", "short circuit tripping" and "load shedding". The alarm signalling block reports the operational status of the breaker locally or remotely. Locally, the event "alarm" or "overload and short circuit tripping" is signalled by an LED display. Its power supply can be between 24 and 240 V AC/DC, and is essentially independent of the main current. Reliable alarm capabilities therefore exist under any operating conditions. For the remote indication of the breaker functions, there are a break contact and a make contact each. The signals are thus available for additional control tasks.

In this system, the contact system of the alarm relay is complex and expensive, since separate contacts are used for the make and break functions. In electronic circuits, a great deal of emphasis is also placed on the lowest possible energy consumption. This low energy consumption is not necessarily optimally achieved in the above-referenced known system, on account of the permanent activation of the relay.

German Patent No. 31 14 551 C2 discloses a circuit breaker unit which includes an electronic tripping device in the form of a microprocessor and an alarm device. The transmission from the circuit breaker to the separate alarm device is pulse coded. For the remote indication of an alarm and tripping, there are two relays. This known system also appears to be unable to eliminate the above-mentioned disadvantages.

Another brochure, published by Kloeckner-Moeller in March 1994, namely W 123-7335, also provides some description of the aforementioned NZM 10 Power Circuit Breaker, and also forms part of the Appendix attached hereto.

Both of the aforementioned brochures which have been included herewith as an Appendix, namely Kloeckner-Moeller brochures W 123-7276 and W 123-7335, are hereby incorporated by reference into the instant specification as if set forth in their entirety herein.

OBJECT OF THE INVENTION

An object of the present invention is therefore to create a circuit configuration for an alarm device of the type described in the "Field of the Invention" section of this specification, which makes it possible to perform a make or break function for an indication of the operational status of the circuit breaker by means of a simple, possibly single, contact point and which, on account of energy-conservation measures, represents a more economical solution than the known systems discussed above.

SUMMARY OF THE INVENTION

In accordance with at least one preferred embodiment of the present invention, it is contemplated herein that the above object can be accomplished by an arrangement in which the fault signal is transmitted to the circuit configuration, and, by means of logic operation with the action of a static standard signal and of a clock pulse signal, acts on the electrical relay, which is preferably realized in the form of a bistable relay, the contact system of which corresponds to a make function or a break function, depending on the signal status of the standard signal.

Advantageous refinements of the invention are disclosed herebelow. The logic operation of the fault signals can preferably be realized so that the standard signal acts as the input signal of a first exclusive-OR gate, and the output signal of the first exclusive-OR gate acts on one hand directly on a first coil connector of the bistable relay, and on the other hand as the input signal of a second exclusive-OR gate, whereby a synchronized clock signal acts as an additional input signal of the second exclusive-OR gate, the output of which acts on a second coil connector of the bistable relay. It is particularly advantageous if the synchronized clock signal can be generated by the microcontroller, and can have a pulse duty factor clock pulse to interpulse period of 1:1 and acts permanently on the input. The standard signal can be appropriately generated by a mechanical switching device and can act as a static input signal. The contact system of the bistable relay preferably acts when a fault signal occurs, and when the mechanical switching device is closed or open, it preferably acts as a make contact or as a break contact, respectively. It can also be particularly advantageous if the fault signal is realized as an active-low signal and/or if each fault signal is sampled and optically displayed by a signal status display. Finally, it can be advantageous that the circuit configuration effects essentially an indirect monitoring of the relay, in which, not later than one-half the current duration of the clock pulse, the relay is forcibly placed in its specified setpoint position.

The invention, in accordance with at least one preferred embodiment, preferably takes advantage of the characteristics of a bistable relay. The fault signal is preferably linked with a static standard signal and a clock signal generated by the microcontroller. After a change of polarity of the control pulses at the coil connectors of the bistable relay, the relay preferably switches. As a result of the activation which is controlled by a clock pulse signal, and as a function of the pulse duty factor, the energy consumption of the relay can be reduced by up to one-half. The use of the bistable relay can essentially result in a reduction of the contact system to only one simple, possibly single, contact, which preferably functions as a make or break contact, as a function of the potential of the preselection, or standard, signal. With one output pin for the fault signal, the logic operation therefore can essentially achieve two different types of functions of the contacts. The low energy consumption of the relay makes possible a direct activation without additional driver stages.

With the simple use of bistable relays, e.g. to reduce energy, external factors such as impacts and vibrations can result in an unintentional setting or resetting of the relay, which remains unrecognized by the circuit logic. In the circuit configuration contemplated by at least one preferred embodiment of the present invention, the unintentional reversal of the contacts can essentially be automatically corrected by the clock pulse. The present invention, in accordance with at least one preferred embodiment, can therefore essentially reduce to a minimum the number of components required, the amount of energy required and the size of the circuit configuration. Further, relays set incorrectly can essentially be automatically corrected.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the invention resides broadly in a circuit breaker with a signalling device, said circuit breaker comprising: at least one electrical input portion; at least one electrical output portion; at least one breaker mechanism for connecting and disconnecting with respect to at least one of: said at least one electrical input portion; and said at least one electrical output portion; means for connecting and disconnecting said at least one breaker mechanism with said at least one of: said at least one electrical input portion; and said at least one electrical output portion; a signalling device for transmitting signals to said at least one electrical input portion to activate said at least one breaker mechanism; said signalling device comprising: means for monitoring power related to said circuit breaker; means for detecting a fault condition in a circuit connected to said circuit breaker; means for transmitting a signal upon detection, by said monitoring means and said detecting means, of a fault condition related to said circuit breaker; means for selecting at least one of: a make function; and a break function; of said signalling device; means for assuming a bistable condition; said means for assuming a bistable condition comprising: means for transmitting a make signal upon the transmission of a signal by said transmitting means and upon the selection of a make function by said selecting means; and means for transmitting a break signal upon the transmission of a signal by said transmitting means and upon the selection of a break function by said selecting means; and means for electrically connecting said means for assuming a bistable condition and said at least one electrical input portion.

BRIEF DESCRIPTION OF THE DRAWINGS

The invention is explained in greater detail below with reference to the embodiment illustrated in the accompanying drawings, wherein.

DESCRIPTION OF THE PREFERRED EMBODIMENT

Figure 1:
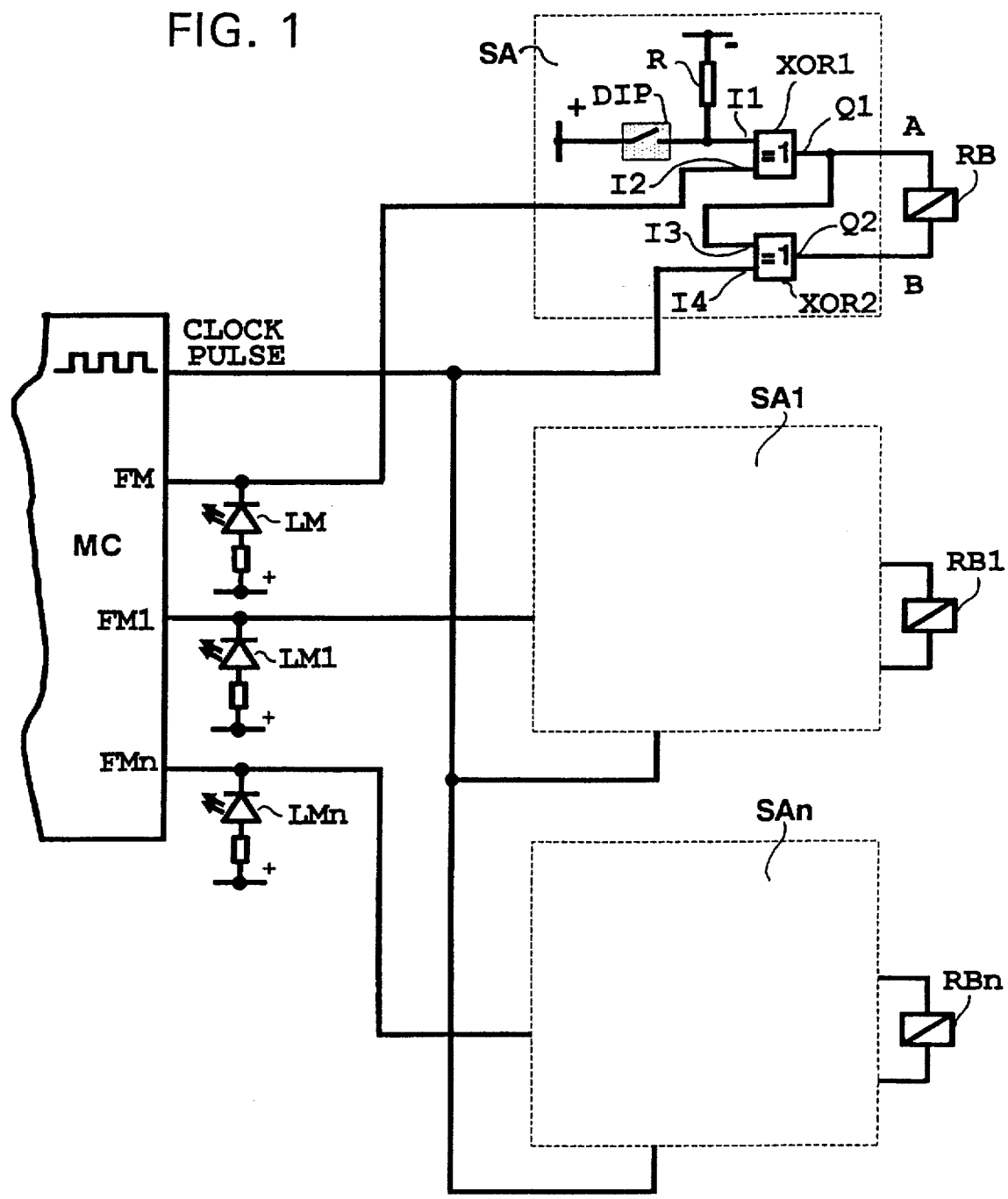
FIG. 1 is a schematic diagram of the circuit configuration which processes a fault signal originating from the microcontroller and activates a bistable relay.

FIG. 1 is a schematic diagram of a circuit configuration which processes a fault signal originating from the microcontroller and activates a bistable relay. The microcontroller MC preferably has, on one hand, the outputs for the fault signals FM, FM1 . . . FMn, and on the other hand the clock pulse output "Clock Pulse". The fault signals FM, FM1 . . . FMn are preferably low-active, so that when a fault signal appears, the LEDs LM, LM1 . . . Lmn, connected with a pre-resistance to positive potential +, are illuminated and display the fault signal. The circuit configuration SA preferably includes a first exclusive-OR gate XOR1, a second exclusive-OR gate XOR2, a resistance R and a DIP switch, which is preferably realized in the form of a dual in-line package construction.

The fault signal FM is preferably applied to, or at, the input I2 of the first exclusive-OR gate XOR1, the input I1 of which preferably receives a static standard signal. The standard signal is preferably generated by connecting the input I1 by means of the resistance R to a negative potential (−) and by means of the DIP switch to a positive potential (+). The input I3 of the second exclusive-OR gate XOR2 is preferably connected directly to the output Q1 of the first exclusive-OR gate XOR1. The input I4 of the second exclusive-OR gate XOR2 is preferably connected to the clock pulse output "Clock Pulse" of the microcontroller MC. The output Q1 of the first exclusive-OR gate XOR1 is preferably connected to a coil connector A of a bistable relay RB and the output Q2 of the second exclusive-OR gate XOR2 is preferably connected to the coil connector B of the bistable relay RB. The circuit configurations SA1 . . . SAn are preferably designed the same as the circuit configuration SA, whereby the fault signals FM1 . . . FMn act as input signals, and the bistable relays RB1 . . . RBn are activated by the corresponding circuit configurations SA1 . . . SAn.

In accordance with at least one preferred embodiment of the present invention, the aforementioned "static standard signal" and "standard signal" may be alternatively referred to as "static advance signal", "static preselection signal", "static reference signal'" or even simply "standard signal", "advance signal", "preselection signal" or "reference signal".

Figure 2:
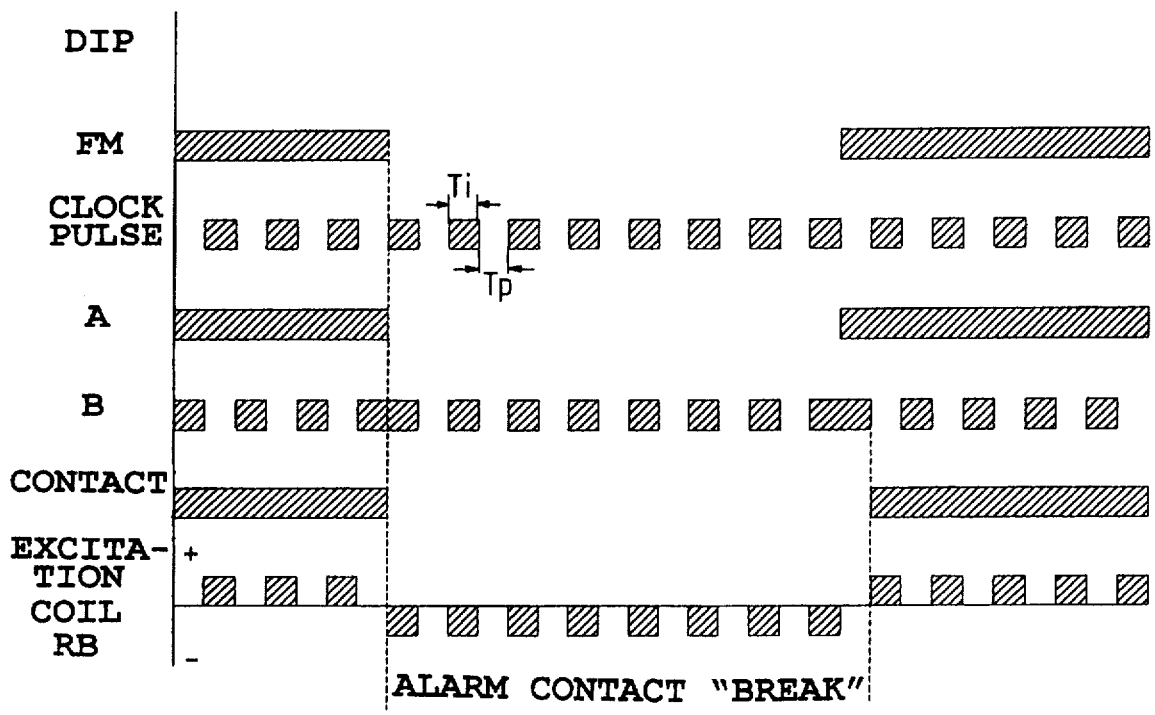
FIG. 2 is a pulse diagram, whereby the alarm contact of the bistable relay has a break function for the duration of the fault signal.
Figure 3:
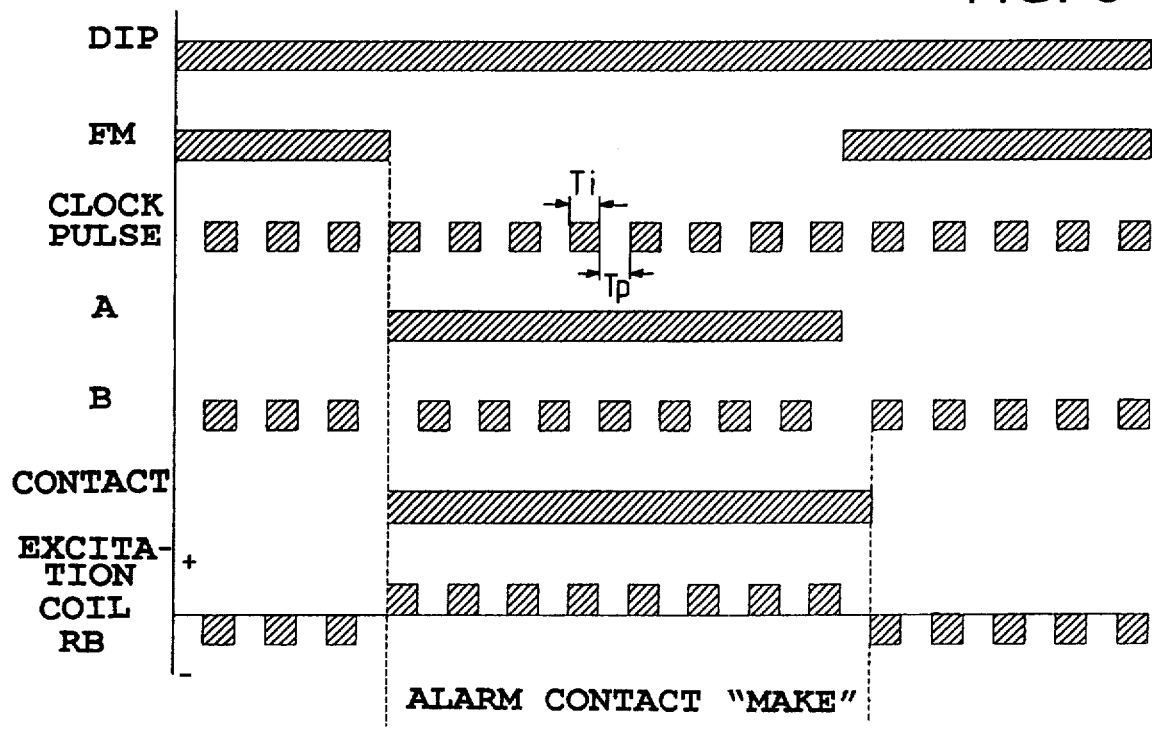
FIG. 3 is a pulse diagram, whereby the alarm contact of the bistable relay has a make function for the duration of the fault signal.

The logic operation and the resulting signal sequence, or the pulsed excitation of the coil of the bistable relay RB, in accordance with a preferred embodiment of the present invention, is illustrated in FIGS. 2 and 3. Reference is thereby made to circuit configuration SA in FIG. 1.

FIG. 2 shows a pulse diagram, whereby the alarm contact of the bistable relay essentially has a break function for the duration of the fault signal. The DIP switch is opened, so that by means of the resistance R, a low signal is statically applied to the input I1 of the first exclusive-OR gate XOR1. The fault signal FM is preferably low-active, so that in normal operation, the fault signal FM is at high potential. The output Q1 of the exclusive-OR gate XOR1 essentially changes its voltage potential from high to low when the fault signal FM appears, and essentially remains at low potential for the duration of the fault signal. The output Q2 of the exclusive-OR gate XOR2 preferably pulses according to the signals applied to its input I3, which is preferably connected directly to the output Q1 of the exclusive-OR gate XOR1, and to its input I4, which is preferably connected to the clock pulse output Clock Pulse of the microcontroller MC. On the other hand, if there is no fault signal FM, the output pulses to the coil connector B of the bistable relay RB can essentially negate the signals of the clock pulse output Clock Pulse. With the descending slope of the fault signal FM, the voltage potential on the coil connector A can essentially become negative with respect to the coil connector B, so that the contact of the bistable relay RB is essentially opened for the duration of the fault signal and functions as a break contact. As soon as the fault signal disappears, the contact can essentially close with the next descending slope at coil connector B.

One desirable stipulation or requirement, in accordance with a preferred embodiment of the present invention, is that the contact is then opened when the voltage potential at the coil connector A is positive in relation to the coil connector B. In the other case, the contact can essentially open, namely when coil connector A has negative potential with respect to coil connector B. The pulse train for the excitation of the coil of relay RB illustrates the switching function of the contact. It also shows that the energy consumption for the excitation of the bistable relay RB is significantly reduced by the clock pulse activation.

FIG. 3 shows a pulse diagram, whereby the alarm contact of the bistable relay has a make function for the duration of the fault signal. When the DIP switch is closed, a static-high signal is essentially applied to the input I1 of the exclusive-OR gate XOR1, and consequently the potential at the coil connector A and at the input I3 of the exclusive-OR gate XOR2 is reversed. The potential of the activation of the bistable relay RB at the connectors A, B is preferably reversed in relation to the illustration in FIG. 2. For the duration of the fault signal, the alarm contact can essentially function as a make contact. The preselection signal is preferably defined by the switch position of the DIP switch, and the switching function of a simple, possibly single, contact of the bistable relay RB.

FIGS. 2 and 3 show that a relay which is incorrectly set as a result of external factors, e.g. impacts, a situation which can normally go undetected, is preferably reset to its original position after the clock pulse time Ti. Thus there can essentially be an indirect monitoring of the relay by means of the circuit configuration.

It should be understood that, within the scope of the present invention, essentially any circuit components capable of providing essentially the same function as the components of the SA circuits expressly disclosed heretofore, may be used.

With regard to the bistable relay RB discussed heretofore, it should be understood that, within the scope of the present invention, it is conceivable to utilize in its stead any of a wide variety of types of electronic bistable circuits or bistable relay circuits, examples of which will generally be well known to those of ordinary skill in the art.

With regard to fault detection, it is conceivable, within the scope of the present invention, to allow for the detection of any of a wide range of faults. For example, it is conceivable to utilize the components discussed herein in conjunction with the detection of ground faults, faults relating to loss of phase in a three-phase arrangement, faults relating to unbalance or imbalance such as in a three-phase arrangement, and faults relating to phase shift. These and other types of fault detection will generally be well-known to those of ordinary skill in the art and thus would not appear to warrant any further discussion herein.

The disclosure now turns to an example of a current limiting circuit breaker having components which may be utilized in accordance with the embodiments of the present invention. It should be understood that components discussed herebelow with reference to FIGS. 4–5 may, if appropriate, be considered to be interchangeable with components discussed hereabove with relation to FIGS. 1–3.

Figure 4:
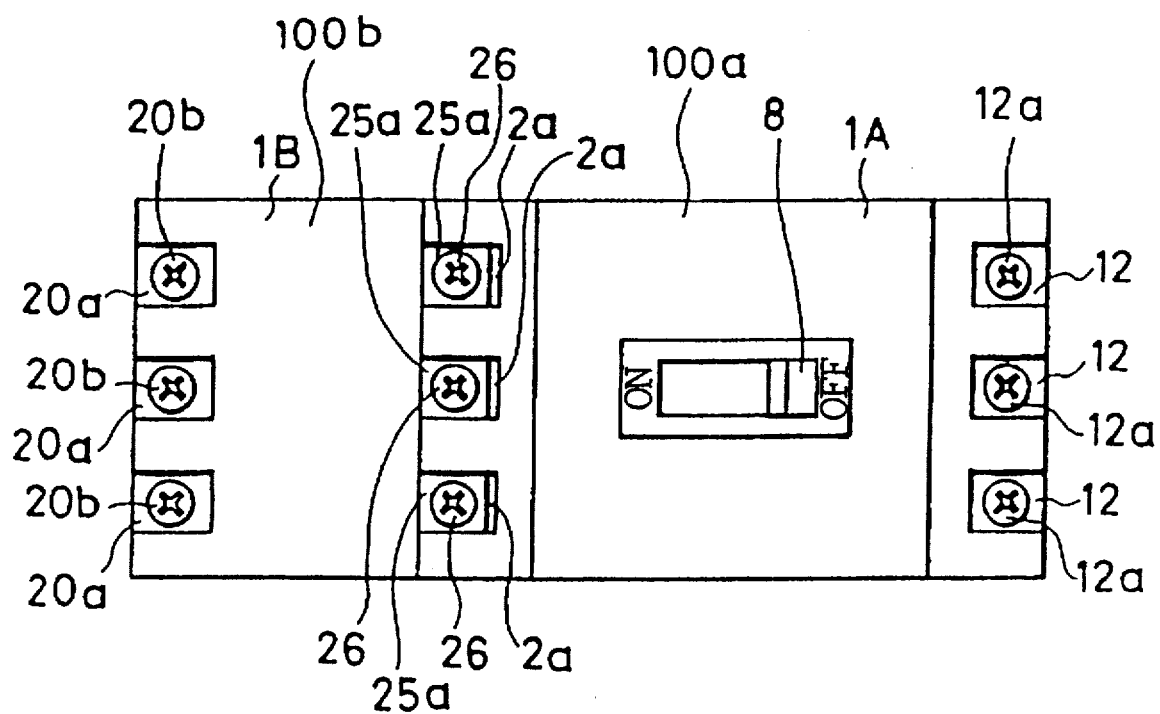
FIG. 4 is a plan view showing a current limiting circuit breaker in which the present invention may be employed.

As shown in FIG. 4, a current limiting circuit breaker, in which the present invention may be employed, may preferably comprise a circuit breaker unit 1A and a current limiting unit 1B, which current limiting unit 1B can preferably be attached to the side face of the circuit breaker unit 1A. Three load side terminals 12 may be provided on the right side end of the circuit breaker unit 1A shown in FIG. 4, and three power source side terminals 20a' may be provided on the left side end of the current limiting unit 1B shown in FIG. 4. The circuit breaker unit 1A and the current limiting unit 1B can be formed integrally by connecting a conductor 2 of the circuit breaker unit 1A and a connection conductor 25 of the current limiting unit 1B (see FIG. 5).

Figure 5:
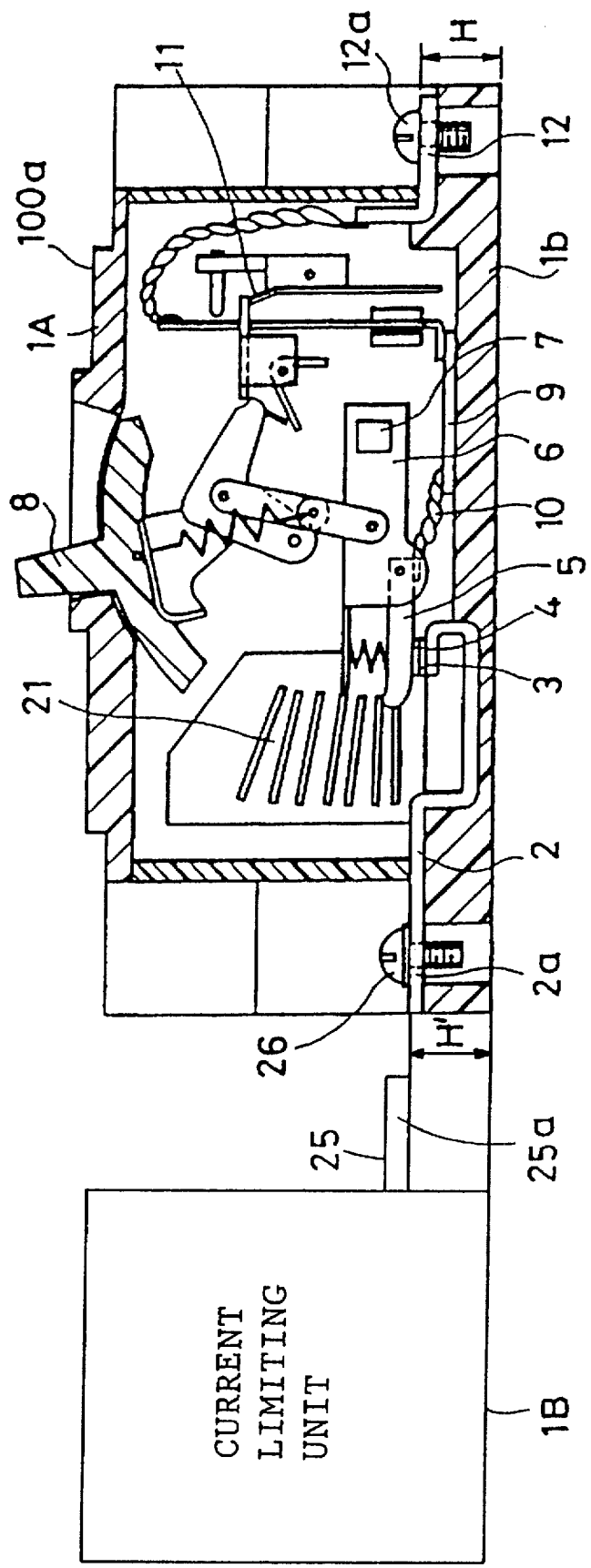
FIG. 5 is a longitudinal sectional side exploded view showing the current limiting circuit breaker of FIG. 4, with a current limiting unit removed therefrom.

In the circuit breaker unit 1A shown in FIG. 5, for instance, three stationary conductors 2 may be fixed to a bottom 1b of the circuit breaker casing 100a, and, at the inner end of each of the stationary conductors 2, there can be corresponding stationary contacts 3. Movable contacts 4, facing towards the stationary contacts 3, can be provided on movable members 5 which are movably held by contact arms 6, respectively. Each contact arm 6 can be rotatably supported by a cross bar 7. An operation handle 8 can be provided projecting upward from the substantial center of the front face (upper face in FIG. 5) of the circuit breaker casing 100a. The contact arms 6 can be turned about the cross bar 7 by turning the operation handle 8. Conductors 9, which can be fixed to the bottom 1b of the circuit breaker casing 100a, can connect one end of the flexible connection members 10, and the other ends of the flexible connection members 10 can be connected to the movable members 5. The fixed conductors 9 can be electrically connected to the load side terminals 12 through overcurrent trip units 11, respectively.

As shown in FIG. 5, the connection terminal 2a having terminal screw bolts 26 and the load side terminal 12 having terminal screw bolts 12a can be provided on both sides of the circuit breaker unit 1A. A height (H') of the connection terminal 2a and a height (H) of the load side terminal 12 can be provided at the same height measured between each upper face of them and the lower face of the circuit breaker casing 100a. A connection terminal 25a of the connection conductor 25 can be projected from the side face of the current limiting unit 1B, and can be provided to ride on the connection terminal 2a of the circuit breaker unit 1A. The power source side terminal 20a of the current limiting unit 1B can be provided to have height H' from the rear face of the current limiting casing 100b as shown in FIG. 4, and a terminal screw bolt 20b can be attached thereto.

In FIG. 5, arc extinguishing chambers, disposed within housing 100a, are indicated at 21.

One feature of the invention resides broadly in the circuit configuration for a signalling device in circuit breaker units, in particular in power circuit breakers, which have an electronic tripping device and which become effective in the event of a fault in an electrical system to be protected, whereby the electronic tripping device consists essentially of a microcontroller which performs a fault evaluation, and for each type of fault makes available an output pin, from which the corresponding fault signal is amplified and transmitted to an electrical relay, characterized by the fact that the fault signal FM, FM1 ... FMn is transmitted to the circuit configuration SA, SA1 ... SAn, and by means of logic operation with the action of a static standard signal and of a clock pulse signal (Clock Pulse) acts on the electrical relay, which is realized in the form of a bistable relay RB, RB1 ... RBn the contact system of which corresponds to a make function or a break function, depending on the signal status of the standard signal.

Another feature of the invention resides broadly in the circuit configuration for a signalling device in circuit breaker units characterized by the fact that the logic operation of the fault signal FM, FM1 ... FMn is accomplished in that the standard signal acts as the input signal I1 and the fault signal FM, FM1 ... FMn as the input signal of a first exclusive-OR gate XOR1; the output signal Q1 of the first exclusive-OR gate XOR1 acts on one hand directly on a first coil connector A of the bistable relay RB and on the other hand as the input signal I3 of a second exclusive-OR gate XOR2; the synchronized clock pulse signal (Clock Pulse) acts as an additional input signal I4 of the second exclusive-OR gate XOR2, the output Q2 of which acts on a second coil connector B of the bistable relay RB.

Yet another feature of the invention resides broadly in the circuit configuration for a signalling device in circuit breaker units characterized by the fact that the synchronized clock pulse signal (Clock Pulse) is generated by the microcontroller MC and has a pulse duty factor clock pulse Ti to interpulse period Tp of 1:1, and acts permanently on the input I4 of the exclusive-OR gate XOR2.

Still another feature of the invention resides broadly in the circuit configuration for a signalling device in circuit breaker units characterized by the fact that the standard signal is generated by a switch DIP and acts as a static input signal I1.

A further feature of the invention resides broadly in the circuit configuration for a signalling device in circuit breaker units characterized by the fact that the contact system of the bistable relay RB acts as a make contact when the switch DIP is closed and when there is a fault signal FM, and as a break contact when the switch DIP is open and there is a fault signal FM.

Another feature of the invention resides broadly in the circuit configuration for a signalling device in circuit breaker units characterized by the fact that the fault signal FM, FM1 ... FMn is realized as an active-low signal.

Yet another feature of the invention resides broadly in the circuit configuration for a signalling device in circuit breaker units characterized by the fact that each fault signal FM, FM1 ... FMn is sampled by a signal status indicator LM, LM1 ... LMn and is displayed visually.

Still another feature of the invention resides broadly in the circuit configuration for a signalling device in circuit breaker units characterized by the fact that the circuit configuration SA, SA1 ... SAn performs an indirect monitoring of the relay RB, RB1 ... RBn, so that, not later than after the duration of current of the clock pulse Ti, the relay RB, RB1 ... RBn is forcibly set to its specified switch position.

Examples of bistable relays, bistable circuits and bistable relay circuits, which may be utilized in accordance with the embodiments of the present invention, may be found in the following U.S. Patents: U.S. Pat. No. 4,686,604, which issued to Gilman on Aug. 11, 1987; U.S. Pat. No. 4,743,877, which issued to Oberndorfer et al. on May 10, 1988; U.S. Pat. No. 4,774,623, which issued to Gilman on Sep. 27, 1988; U.S. Pat. No. 4,794,216, which issued to Seeger on Dec. 27, 1988; U.S. Pat. No. 4,874,962, which issued to Hermans on Oct. 17, 1989; U.S. Pat. No. 4,634,987, which issued to Nolte on Jan. 6, 1987; U.S. Pat. No. 4,635,229, which issued to Okumura et al. on Jan. 6, 1987; U.S. Pat. No. 4,698,531, which issued to Jones on Oct. 6, 1987; U.S. Pat. No. 4,713,652, which issued to French et al. on Dec. 15, 1987; U.S. Pat. No. 4,771,187, which issued to Kawamura on Sep. 13, 1988; and U.S. Pat. No. 4,849,653, which issued to Imai et al. on Jul. 18, 1989.

Examples of clock pulse arrangements, which may be utilized in accordance with the embodiments of the present invention, may be found in the following U.S. Pat. No. 4,635,037, which issued to Iwamura on Jan. 6, 1987; U.S. Pat. No. 4,635,116, which issued to Hirota et al. on Jan. 6, 1987; U.S. Pat. No. 4,639,909, which issued to Nirschl et al. on Jan. 27, 1987; and U.S. Pat. No. 4,641,306, which issued to Annecke on Feb. 3, 1987.

Coil connector arrangements are generally well-known to those of ordinary skill in the art and thus do not appear to warrant any further description herein. An example of such an arrangement may be found in U.S. Pat. No. 4,691,978, which issued to Lemmer on Sep. 8, 1987.

Examples of exclusive-OR gate arrangements, which may be utilized in accordance with the embodiments of the present invention, may be found in the following U.S. Patents: U.S. Pat. No. 4,635,037, which issued to Iwamura on Jan. 6, 1987; U.S. Pat. No. 4,638,497, which issued to Komatsu et al. on Jan. 20, 1987; U.S. Pat. No. 4,756,011, which issued to Cordell on Jul. 5, 1988; and U.S. Pat. No. 4,760,354, which issued to Kianush on Jul. 26, 1988.

Examples of DIP switch arrangements, which may be utilized in accordance with the embodiments of the present invention, may be found in the following U.S. Patents: U.S. Pat. No. 4,639,566, which issued to DeHaitre on Jan. 27, 1987; U.S. Pat. No. 4,644,110, which issued to Watanabe et al. on Feb. 17, 1987; U.S. Pat. No. 4,670,630, which issued to Kikta et al. on Jun. 2, 1987; and U.S. Pat. No. 4,708,791, which issued to Dillard, III, on Nov. 24, 1987.

Examples of electronic trip arrangements, such as in circuit breakers, which may be utilized in accordance with the embodiments of the present invention, may be found in the following U.S. Patents: U.S. Pat. No. 4,641,117, which issued to Willard on Feb. 3, 1987; U.S. Pat. No. 4,706,158, which issued to Todaro et al. on Nov. 10, 1987; U.S. Pat. No. 4,710,844, which issued to Scott et al. on Dec. 1, 1987; and U.S. Pat. No. 4,712,151, which issued to Dvorak on Dec. 8, 1987.

Examples of microprocessors/microcontrollers for use with electronic circuit breakers, which may be utilized in accordance with the embodiments of the present invention, may be found in the following U.S. Patents: U.S. Pat. No. 4,682,264, which issued to Demeyer on Jul. 21, 1987; U.S. Pat. No. 4,710,845, which issued to Demeyer on Dec. 1, 1987; U.S. Pat. No. 4,717,985, which issued to Demeyer on Jan. 5, 1988; and U.S. Pat. No. 4,780,786, which issued to Weynachter et al. on Oct. 25, 1988.

General principles relating to make-or-break connections and the like may be discussed in the following U.S. Patents: U.S. Pat. No. 4,636,761, which issued to Caruso et al. on Jan. 13, 1987; U.S. Pat. No. 4,719,359, which issued to Rose on Jan. 12, 1988; U.S. Pat. No. 4,723,267, which issued to Jones et al. on Feb. 2, 1988; and U.S. Pat. No. 4,739,127, which issued to Higuchi et al. on Apr. 19, 1988.

Examples of alarm/signal arrangements for circuit breakers, which may be utilized in accordance with the embodiments of the present invention, may be found in the following U.S. Patents: U.S. Pat. No. 4,698,621, which issued to Masot on Oct. 6, 1987; U.S. Pat. No. 4,706,073, which issued to Masot on Nov. 10, 1987; U.S. Pat. No. 4,833,461, which issued to Yeager on May 23, 1989; and U.S. Pat. No. 4,834,278, which issued to Lin on May 30, 1989.

Examples of pulse-coded-signal arrangements, which may be utilized in accordance with the embodiments of the present invention, may be found in the following U.S. Patents: U.S. Pat. No. 4,677,398, which issued to Honeycutt et al. on Jun. 30, 1987; U.S. Pat. No. 4,755,792, which issued to Pezzolo et al. on Jul. 5, 1988; U.S. Pat. No. 4,785,282, which issued to Martell and Martell on Nov. 15, 1988; and U.S. Pat. No. 4,826,577, which issued to Lange on May 2, 1989.

General principles relating to pulse duty factor may be discussed in the following U.S. Patents: U.S. Pat. No. 4,654,771, which issued to Stasch et al. on Mar. 31, 1987; U.S. Pat. No. 4,683,861, which issued to Breitkreuz et al. on Aug. 4, 1987; U.S. Pat. No. 4,735,113, which issued to Yamamuro et al. on Apr. 5, 1988.

Examples of advance signal arrangements, which may be utilized in accordance with the embodiments of the present invention, may be found in the following U.S. Patents: U.S. Pat. No. 4,751,469, which issued to Nakagawa et al. on Jun. 14, 1988; U.S. Pat. No. 4,777,433, which issued to Steele et al. on Oct. 11, 1988; U.S. Pat. No. 4,835,448, which issued to Dishner et al. on May 30, 1989; and U.S. Pat. No. 4,876,702, which issued to Lesko on Oct. 24, 1989.

Examples of arrangements for detecting ground faults, which may be utilized in accordance with the embodiments of the present invention, may be found in the following U.S. Patents: U.S. Pat. No. 4,710,751, which issued to Webster on Dec. 1, 1987; U.S. Pat. No. 4,725,914, which issued to Garitty on Feb. 16, 1988; U.S. Pat. No. 4,809,123, which issued to Ailington et al. on Dec. 28, 1989.

Examples of arrangements for detecting phase faults, which may be utilized in accordance with the embodiments of the present invention, may be found in the following U.S. Patents: U.S. Pat. No. 4,694,373, which issued to Demeyer on Sep. 15, 1987; U.S. Pat. No. 4,803,635, which issued to Andow on Feb. 7, 1989; and U.S. Pat. No. 4,853,819, which issued to Suwa et al. on Aug. 1, 1989.

Examples of arrangement for detecting unbalance-related faults, which may be utilized in accordance with the embodiments of the present invention, may be found in the following U.S. Patents: U.S. Pat. No. 4,644,248, which issued to Brennen et al. on Feb. 17, 1987; U.S. Pat. No. 4,685,022, which issued to Nichols et al. on Aug. 4, 1987; U.S. Pat. No. 4,724,503, which issued to Libert on Feb. 9, 1988.

Examples of arrangements for detecting three-phase-related faults, which may be utilized in accordance with the embodiments of the present invention, may be found in the following U.S. Patents: U.S. Pat. No. 4,751,653, which issued to Junk et al. on Jun. 14, 1988; U.S. Pat. No. 4,758,919, which issued to Stewart on Jul. 19, 1988; U.S. Pat. No. 4,795,983, which issued to Crockett et al. on Jan. 3, 1989; and U.S. Pat. No. 4,819,119, which issued to Wilkinson on Apr. 4, 1989.

Examples of arrangements for detecting phase-shift-related faults, which may be utilized in accordance with the embodiments of the present invention, may be found in the following U.S. Patents: U.S. Pat. No. 4,686,677, which issued to Flora on Aug. 11, 1987; U.S. Pat. No. 4,782,241, which issued to Baker et al. on Nov. 1, 1988; U.S. Pat. No. 4,841,209, which issued to Poumakis on Jun. 20, 1989; U.S. Pat. No. 4,890,005, which issued to Schornack on Dec. 26, 1989.

Examples of annunciator/detector/anticipator arrangements, and components associated therewith, which may be utilized in accordance with the embodiments of the present invention, such as with the microcontroller MC shown in FIG. 1 herein, may be found in the following U.S. Patents: U.S. Pat. No. 4,647,920, which issued to Corso on Mar. 3, 1987; U.S. Pat. No. 4,845,594, which issued to Wilkerson on Jul. 4, 1989; U.S. Pat. No. 4,774,510, which issued to Steinke on Sep. 27, 1988; U.S. Pat. No. 4,823,224, which issued to Hagerman et al. on Apr. 18, 1989; U.S. Pat. No. 4,829,290, which issued to Ford on May 9, 1989; U.S. Pat. No. 4,713,720, which issued to Rogers et al. on Dec. 15, 1987; U.S. Pat. No. 4,780,787, which issued to Dano et al. on Oct. 25, 1988; and U.S. Pat. No. 4,864,519, which issued to Appleby et al. on Sep. 5, 1989.

U.S. Pat. No. 4,335,413, which issued to Engel et al. on Jun. 15, 1982, and which corresponds to Federal Republic of Germany Patent No. 31 14 551 C2 cited heretofore, disclosed examples of components, associated with electronic circuit breakers, that may be utilized in accordance with the embodiments of the present invention.

Other examples of components, associated with electronic circuit breakers, that may be utilized in accordance with the embodiments of the present invention, may be found in the following publications: Federal Republic of Germany Patent No. 24 38 616 A1; "Digital Programmable Time-Parameter Offers Versatility and Accuracy" by E. O. Schweitzer, as found in *IEEE Transactions on Power Apparatus and Systems*, 1980, U.S. Pat. No. 1, pp. 152–157; Siemens Publication No. E141/1386-101 (1974), entitled "Electronic Definite-Time Overcurrent Protection Systems"; "SINAUT 8-FW, ein rechnergeführtes Fernwirksystem" by Benez et al., as found in *Siemens-Zeitschrift*, 1978, H.11, pp. 601–605; "Results of Field Experiments of Digital Relays Utilizing Minicomputer and Microprocessor" by Suzuki et al., as found in *IFAC Conference on Automatic Control and Protection of Electrical Power Systems*, February 1977; a descriptive bulletin from General Electric entitled "Motor Protective Relay IC305 MLTA", December 1978; "Micro Versatrip Programmer . . . ", by G. C. Eckart, as found in *Industrial Power Systems*, June 1979; and "Operating and Instruction Guide" in *Matco Energy Monitor*.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 06 902.2, filed on Mar. 3, 1994, having inventors Oliver Borchmann and Thomas Bungartz, and DE-OS P 44 06 902.2 and DE-PS P 44 06 902.2, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Circuit configuration for a signalling device in circuit breaker units, which have an electronic tripping device and which become effective in the event of a fault in an electrical system to be protected, whereby the electronic tripping device consists essentially of a microcontroller which performs a fault evaluation, and for each type of fault makes available an output pin, from which the corresponding fault signal is amplified and transmitted to an electrical relay, wherein the fault signal [(FM, FM1 . . . FMn)] is transmitted to the circuit configuration [(SA, SA1 . . . SAn)], and by means of logic operation with the action of a static standard signal and of a clock pulse signal [(Clock Pulse) acts] act on the electrical relay, which is realized in the form of a bistable relay [(RB, RB1 . . . RBn)] the contact system of which corresponds to a make function or a break function, depending on the signal status of the standard signal.

2. Circuit configuration for a signalling device in circuit breaker units as claimed in claim 1, wherein:

the logic operation of the fault signal [(FM, FM1 . . . FMn)] is accomplished in that the standard signal acts as the input signal [(I1)] and the fault signal [(FM, FM1 . . . FMn)] as the input signal of a first exclusive-OR gate [(XOR1)];

the output signal [(Q1)] of the first exclusive-OR gate [(XOR1)] acts on one hand directly on a first coil connector [(A)] of the bistable relay [(RB)] and on the other hand as the input signal [(I3)] of a second exclusive-OR gate [(XOR2)]; and the synchronized clock pulse signal [(Clock Pulse)] acts as an additional input signal [(I4)] of the second exclusive-OR gate [(XOR2)], the output [(Q2)] of which acts on a second coil connector [(B)] of the bistable relay [(RB)].

3. Circuit configuration for a signalling device in circuit breaker units as claimed in claim 2, wherein the synchronized clock pulse signal [(Clock Pulse)] is generated by the microcontroller [(MC)] and has a pulse duty factor clock pulse [(Ti)] to interpulse period [(Tp)] of 1:1, and acts permanently on the input [(I4)] of the exclusive-OR gate [(XOR2)].

4. Circuit configuration for a signalling device in circuit breaker units as claimed in claim 3, wherein the standard signal is generated by a switch [(DIP)] and acts as a static input signal [(I1)].

5. Circuit configuration for a signalling device in circuit breaker units as claimed in claim 4, wherein the contact system of the bistable relay [(RB)] acts as a make contact when the switch [(DIP)] is closed and when there is a fault signal [(FM)], and as a break contact when the switch [(DIP)] is open and there is a fault signal [(FM)].

6. Circuit configuration for a signalling device in circuit breaker units as claimed in claim 5, wherein the fault signal [(FM, FM1 . . . FMn)] is realized as an active-low signal.

7. Circuit configuration for a signalling device in circuit breaker units as claimed in claim 6, wherein each fault signal [(FM, FM1 . . . FMn)] is sampled by a signal status indicator [(LM, LM1 LMn)] and is displayed visually.

8. Circuit configuration for a signalling device in circuit breaker units as claimed in claim 7, wherein the circuit configuration [(SA, SA1 . . . SAn)] performs an indirect monitoring of the relay [(RB, RB1 . . . RBn)], so that, not later than after the duration of current of the clock pulse [(Ti)], the relay [(RB, RB1 . . . RBn)] is forcibly set to its specified switch position.

9. Circuit configuration for a signalling device in circuit breaker units as claimed in claim 1, wherein the standard signal is generated by a switch [(DIP)] and acts as a static input signal [(I1)].

10. Circuit configuration for a signalling device in circuit breaker units as claimed in claim 2, wherein the standard signal is generated by a switch [(DIP)] and acts as a static input signal [(I1)].

11. Circuit configuration for a signalling device in circuit breaker units as claimed in claim 1, wherein the fault signal [(FM, FM1 . . . FMn)] is realized as an active-low signal.

12. Circuit configuration for a signalling device in circuit breaker units, the circuit breaker units having an electronic tripping device becoming effective in the event of a fault in an electrical system to be protected, whereby such an electronic tripping device includes a microcontroller configured for performing a fault evaluation, wherein such a microcontroller, for each type of fault, makes available an output pin, from which output pin the corresponding fault signal is amplified and transmitted to an electrical relay, wherein:

said circuit configuration is configured for receiving the fault signal, and, by means of logic operation with the action of a static standard signal and of a clock pulse signal, for acting on the electrical relay;

said electrical relay comprising a bistable relay; and said bistable relay comprising a contact system, said contact system corresponding to a make function or a break function, depending on the signal status of the standard signal.

13. Circuit configuration for a signalling device in circuit breaker units as claimed in claim 12, wherein:

the logic operation of the fault signal is accomplished in that the standard signal acts as an input signal, and the fault signal acts as an input signal, of a first exclusive-OR gate;

the output signal of the first exclusive-OR gate acts, on one hand, directly on a first coil connector of the bistable relay and, on the other hand, as the input signal of a second exclusive-OR gate;

the synchronized clock pulse signal acts as an additional input signal of the second exclusive-OR gate; and the output of the second exclusive-OR gate acts on a second coil connector of the bistable relay.

14. Circuit configuration for a signalling device in circuit breaker units as claimed in claim 13, wherein the synchronized clock pulse signal is generated by the microcontroller and has a ratio of pulse duty factor clock pulse to interpulse period of 1:1, and acts permanently on the input of the exclusive-OR gate.

15. Circuit configuration for a signalling device in circuit breaker units as claimed in claim 14, wherein the standard signal is generated by a switch and acts as a static input signal.

16. Circuit configuration for a signalling device in circuit breaker units as claimed in claim 15, wherein the contact system of the bistable relay acts as a make contact when the switch is closed and when there is a fault signal, and as a break contact when the switch is open and there is a fault signal.

17. Circuit configuration for a signalling device in circuit breaker units as claimed in claim 16, wherein the fault signal is realized as an active-low signal.

18. Circuit configuration for a signalling device in circuit breaker units as claimed in claim 17, wherein each fault signal is sampled by a signal status indicator and is displayed visually.

19. Circuit configuration for a signalling device in circuit breaker units as claimed in claim 18, wherein the circuit configuration performs an indirect monitoring of the relay, so that, not later than after the duration of current of the clock pulse, the relay is forcibly set to its specified switch position.

* * * * *

UNITED STATES PATENT AND TRADEMARK OFFICE
CERTIFICATE OF CORRECTION

PATENT NO. : 5,614,888  
DATED : March 25, 1997  
INVENTOR(S) : Oliver BORCHMANN and Thomas BUNGARTZ It is certified that error appears in the above-identified patent and that said Letters Patent is hereby corrected as shown below:

In column 1, line 33, after 'reports', delete "Lhe" and insert --the--.

In column 6, line 19, after 'FIGS.', delete "4-5" and insert --4 and 5--.

In column 6, line 29, after 'terminals', delete " 20a' " and insert --20a--.

In column 10, line 43, after '1980,' delete "U.S. Pat.".

In column 11, line 33, Claim 1, after 'signal' delete "[(FM,FM1 ... FMn)]".

In column 11, line 34, Claim 1, after 'configuration' delete "[(SA, SA1 ... SAn)]".

In column 11, line 36, Claim 1, after the second occurrence of 'signal' delete "[(Clock Pulse) acts]".

In column 11, line 38, Claim 1, after 'relay' delete "[(RB, RB1 ... RBn)]".

In column 11, lines 43-44, Claim 2, after 'signal' delete "[(FM, FM1 ... FMn)]".

UNITED STATES PATENT AND TRADEMARK OFFICE
CERTIFICATE OF CORRECTION

PATENT NO. : 5,614,888
DATED : March 25, 1997
INVENTOR(S) : Oliver BORCHMANN and Thomas BUNGARTZ It is certified that error appears in the above-identified patent and that said Letters Patent is hereby corrected as shown below:

In column 11, line 45, Claim 2, after the first occurrence of 'signal' delete "[(I1)]".

In column 11, lines 45-46, Claim 2, after the second occurrence of 'signal' delete "[(FM, FM1 ... FMn)]".

In column 11, line 47, Claim 2, after 'gate' delete "[(XOR1)];" and insert --;--.

In column 11, line 48, Claim 2, after 'signal' delete "[(Q1)]".

In column 11, line 49, Claim 2, before 'acts' delete "[(XOR1)]".

In column 11, line 50, Claim 2, after 'connector' delete "[(A)]".

In column 11, line 50, Claim 2, after 'relay' delete "[(RB)]".

In column 11, line 51, Claim 2, after 'signal' delete "[(I3)]".

UNITED STATES PATENT AND TRADEMARK OFFICE
CERTIFICATE OF CORRECTION

PATENT NO. : 5,614,888
DATED : March 25, 1997
INVENTOR(S) : Oliver BORCHMANN and Thomas BUNGARTZ It is certified that error appears in the above-identified patent and that said Letters Patent is hereby corrected as shown below:

In column 11, line 52, Claim 2, after 'gate' delete "[(XOR2)];" and insert --;--.

In column 11, line 54, Claim 2, after 'signal' delete "[(Clock Pulse)]".

In column 11, line 55, Claim 2, after 'signal' delete "[(I4)]".

In column 11, line 56, Claim 2, after 'gate' delete "[(XOR2)]," and insert --,--.

In column 11, line 56, Claim 2, after 'output' delete "[(Q2)]".

In column 11, line 57, Claim 2, after 'connector' delete "[(B)]".

In column 11, line 58, Claim 2, after 'relay' delete "[(RB)]." and insert --.--.

In column 11, line 61, Claim 3, after 'signal' delete "[(Clock Pulse)]".

In column 11, line 62, Claim 3, after 'microcontroller' delete "[(MC)]".

In column 11, line 63, Claim 3, after 'pulse' delete "[(Ti)]".

UNITED STATES PATENT AND TRADEMARK OFFICE
CERTIFICATE OF CORRECTION

PATENT NO. : 5,614,888
DATED : March 25, 1997
INVENTOR(S) : Oliver BORCHMANN and Thomas BUNGARTZ It is certified that error appears in the above-identified patent and that said Letters Patent is hereby corrected as shown below:

In column 11, line 63, Claim 3, after 'period' delete "[(Tp)]".

In column 11, line 64, Claim 3, after 'input' delete "[(I4)]".

In column 11, lines 64-65, Claim 3, after 'gate', delete "[(XOR2)]." and insert --.--.

In column 12, line 1, Claim 4, after 'switch' delete "[(DIP)]".

In column 12, line 2, Claim 4, after 'signal' delete "[(I1)]." and insert --.--.

In column 12, line 5, Claim 5, after 'relay' delete "[(RB)]".

In column 12, line 6, Claim 5, after 'switch' delete "[(DIP)]".

In column 12, line 7, Claim 5, after 'signal' delete "[(FM)]," and insert --,--.

In column 12, line 8, Claim 5, before the first occurrence of 'is' delete "[(DIP)]".

UNITED STATES PATENT AND TRADEMARK OFFICE
CERTIFICATE OF CORRECTION

PATENT NO. : 5,614,888  Page 5 of 6
DATED : March 25, 1997
INVENTOR(S) : Oliver BORCHMANN and Thomas BUNGARTZ It is certified that error appears in the above-identified patent and that said Letters Patent is hereby corrected as shown below:

In column 12, line 8, Claim 5, after 'signal', delete "[(FM)]." and insert --.--.

In column 12, line 11, Claim 6, before 'is' delete "[(FM, FM1 ... FMn)]".

In column 12, line 14, Claim 7, before 'is' delete "[(FM, FM1 ... FMn)]".

In column 12, line 15, Claim 7, before 'and' delete "[(LM, LM1 LMn)]".

In column 12, line 18, Claim 8, after 'configuration' delete "[(SA, SA1 ... SAn)]".

In column 12, line 19, Claim 8, after 'relay' delete "[(RB, RB1 ... RBn)]".

In column 12, line 21, Claim 8, after 'pulse', delete "[(Ti)]," and insert --,--.

In column 12, line 21, Claim 8, after 'relay' delete "[(RB, RB1 ... RBn)]".

In column 12, line 25, Claim 9, after 'switch' delete "[(DIP)]".

In column 12, line 26, Claim 9, after 'signal' delete "[(I1)]." and insert --.--.

UNITED STATES PATENT AND TRADEMARK OFFICE
CERTIFICATE OF CORRECTION

PATENT NO. : 5,614,888
DATED : March 25, 1997
INVENTOR(S) : Oliver BORCHMANN and Thomas BUNGARTZ It is certified that error appears in the above-identified patent and that said Letters Patent is hereby corrected as shown below:

In column 12, line 29, Claim 10, after 'switch' delete "[(DIP)]".

In column 12, line 30, Claim 10, after 'signal' delete "[(I1)]." and insert --.--.

In column 12, line 33, Claim 11, before 'is' delete "[(FM, FM1 ... FMn)]".

Signed and Sealed this

Twenty-sixth Day of August, 1997

Attest:

BRUCE LEHMAN

Attesting Officer

Commissioner of Patents and Trademarks